United States Patent [19]

Deventer

[11] 4,076,262

[45] Feb. 28, 1978

[54] SLIDING SEAL

[75] Inventor: Gert Deventer, Munich, Germany

[73] Assignee: Deventer KG, Germany

[21] Appl. No.: 634,784

[22] Filed: Nov. 24, 1975

[30] Foreign Application Priority Data

Sep. 20, 1975 Germany ............................ 2541992

[51] Int. Cl.² ...................... B65D 53/00; F02F 11/00;
F16J 15/00; F16K 41/00
[52] U.S. Cl. .................................. 277/227; 277/229;
49/489
[58] Field of Search .................. 277/227, 229; 49/489,
49/488, 475, 480, 496

[56] References Cited

U.S. PATENT DOCUMENTS

| 3,333,725 | 8/1967  | Hirata et al. ............... 277/229 X |
| 3,535,824 | 10/1970 | Kessler .......................... 49/489 X |
| 3,572,734 | 3/1971  | Holt ................................. 277/165 |
| 3,685,206 | 8/1972  | Kessler ............................ 49/489 |
| 3,771,801 | 11/1973 | Burke ........................... 277/165 X |
| 3,774,920 | 11/1973 | Sievenpiper ..................... 277/165 |
| 3,920,252 | 11/1975 | Dechavanne ................. 277/165 X |

FOREIGN PATENT DOCUMENTS

| 20,528    | 8/1968 | Japan ..................................... 277/177 |
| 1,299 of  | 1902   | United Kingdom ................. 277/229 |

Primary Examiner—Henry K. Artis
Attorney, Agent, or Firm—Craig & Antonelli

[57] ABSTRACT

Sliding seal constructions including resilient support members carried by a base member in conjunction with a layer of low coefficient friction material extending over the support member at least within a sliding zone of the seal. This layer is connected at respective opposite sides of the support member so that engagement of the seal with a counter surface moving in respective opposite directions does not result in removal of the layer from the sliding zone. Preferred embodiments include arrangements for sealing a rotating shaft, support members with a plurality of lobes for backing the layer in a plurality of positions, unitary base and support member constructions, constructions with separate base members and support members interconnected with one another by dovetail connections, as well as constructions where the layer encapsulates the support member.

33 Claims, 8 Drawing Figures

SLIDING SEAL

BACKGROUND AND SUMMARY OF THE INVENTION

This invention relates to a sliding seal which comprises a profiled flexible base member and within the sliding zone a layer of material having a low coefficient of friction, wherein the layer is extended beyond the sliding zone and is connected with the base member in a shear-resistant manner outside of the friction zone. This invention is related to and is an improvement of the sliding seal construction disclosed in copending, commonly owned U.S. patent application Ser. No. 538,265, filed Jan. 3, 1975. The contents of said copending application are hereby incorporated by reference thereto herein, insofar as such will aid in an understanding of the subject matter of the present invention.

The principle on which this invention is based resides in that the layer present in the sliding zone, made of a material having a low coefficient of friction, which is to effect a reduction in the friction force, is not firmly joined to the base member in the sliding or friction zone — as is the case in the sliding seals known heretofore — but rather is extended past the sliding zone and is joined to the flexible base member only outside of this sliding zone either directly or by way of a connecting element.

This astonishingly simple measure results in a sliding seal with surprising advantages, especially (but not exclusively) during its manufacture, installation, and utilization.

Thus, it is now no longer necessary, when utilizing this invention, to apply or mount layers with maximum firmness to a flexible base member with the aid of complicated processes or expensive methods; rather, it is possible to use, quite simply, a sliding layer, e.g. a film, a band, or a profile, brought together with the base member so that in case of a frictional engagement, this layer shields or covers the base member within the sliding zone.

Thus, the essential aspect in this connection is that only in case of a frictional engagement is the layer pressed against the base member, or vice versa. It is thereby made possible to make the base member essentially responsible alone for the pressure contact of the sliding layer with the moving counter member and thus for the sealing action, and to design the base member with respect to its configuration optimally for this sealing effect. In contrast thereto, the sliding layer made of a material of a low coefficient of friction is solely responsible for attaining low coefficients of friction, wherein the thus-occurring friction forces are absorbed by this layer and are transmitted outside of the sliding zone to the mounting points of this layer to the support member and are transferred to the latter. As a result, a complete separation of the structural elements responsible for the sealing function and for the sliding function has been achieved, making it possible to design these components optimally for the respective, specific task.

Additional advantages of this sliding seal, preferably executed constructional measures, as well as particularly suitable materials have been described in detail in the above-identified application and are equally advantageously applicable to the arrangement of the present invention as described hereinbelow.

The preferred arrangements of the sliding seal according to the above-identified application do satisfy the posed requirements in the fields of application recited in said application to a high degree: thus, they take care, in any event in a specific relative friction and sliding direction, respectively, of an excellent sealing action due to the tongue-like overlapping of the base member by the layer. However, if there is a reversal of motion during the sliding step, it may happen, however, when certain unfavorable conditions prevail that the sealing effect of these sliding seals is somewhat impaired, namely if the sliding layer should be pulled off the base member due to adverse conditions, and the base member than comes into undesirable contact with the moving sliding member.

However, there are cases of utilizing the sliding seals wherein constantly changing sliding directions occur, or even sliding functions occur in all directions, and wherein a sufficient sealing effect must always be ensured, for example during use as a continuous shaft seal in marine engines. Starting with this consideration, the present invention is based at least in part on the task of developing and improving the subject matter of the above-identified application so that even in case of a reversal of motion of the sliding movement, in case of a change in the direction of movement, or even in case of any desired motion direction, the required sealing function of the seal is reliably ensured.

This problem is solved in accordance with the invention by providing that the base member has a profiled support member fully covered by the layer, which latter is joined on both sides of the support member with the base member. Although the layer has a low coefficient of friction with respect to the edge to be sealed and being moved relatively thereto, it has heretofore been impossible to entirely prevent, under especially adverse conditions, that the layer was pulled off the base member when the direction of movement was changed. Such conditions occur, for instance, if foreign bodies or especially tacky deposits contaminate the sealing zone. In this case, the joining of the layer with the base member on both sides of the support member according to this invention provides that the layer is capable of absorbing tensile stresses. These tensile stresses are produced, on the one hand, by the contact force of the support member effective in the sealing direction and, on the other hand, by the effect of foreign impurities effective, for example, on the sliding layer in the sealing zone during a movement of the surface to be sealed. The sealing zone herein is merely the coherent surface, within which the support member applies a force on the counter surface to be sealed by way of the layer.

Furthermore, the invention affords the further advantage that the support member is surrounded on all sides by a layer protecting the support member, which layer is either the sliding layer by itself or in conjunction with the base member. Consequently, the support member is not only exposed to a lesser extent to the mechanical effect of foreign bodies than has previously been the case, but is not exposed either to other influences as much as heretofore, such as, for example, to light, an agressive atmosphere, etc., since the covering layer offers protection. Accordingly, it is also possible to install the seal of the present invention, for example, in windows in any desired orientation, since there is no longer any need for differentiating between a weather side and an interior side. This leads to a considerable simplification of the installation of the sealing strip according to this invention.

The basic function of the support member resides in supplying the contact force necessary for sealing purposes, wherein a distribution of the contact force is to be attempted which is maximally uniform over the entire sealing zone, in order to attain a uniform sealing action. It is contemplated, for example, to employ as the support member according to preferred embodiments of the invention, a tightly coiled spiral spring of a thin, resilient spring wire. In this connection, it is especially advantageous to provide the individual turns of the spiral spring so closely together that the desired uniform contact force is ensured along the sealing zone if the forces introduced by the individual spring wires are distributed by the layer extending over the support member. However, in other especially preferred embodiments of the invention, a support member is advantageously utilized of a foamed synthetic resin or of an essentially homogeneous, e.g. elastomeric material, the uniform contact force of which results from a compression thereof. Also the elastomeric sealing member may according to the invention, depending on the purpose for which it is used, exhibit a plurality of shapes which are of particular advantage in a respective instance, for example the configuration of a tube extending along the sealing zone, or a solid, round material. This provides the advantage that a string-like material manufactured by mass production techniques can be utilized for the support member which need not even be separately attached to the sealing strip of this invention, since it is already held adequately by the layer joined on both sides to the base member. Such arrangements have special advantage where a relatively small sealing play is to be expected. However, where a large amount of sealing clearance can occur, a support member is necessary or contemplated by the invention which is capable of yielding a sufficient contact force over a wide sealing clearance without such force becoming unduly high and thus leading to wear or the development of heat in case of a particularly small seal spacing. Accordingly, an especially advantageous embodiment of the invention resides in fashioning the support member as a backing (supporting) lip. The height of this backing lip is, in a particularly advantageous embodiment, essentially larger than the largest amount of sealing play to be expected. If the sealing play is amller than the height of the sealing lip, then the latter will arch in the direction of movement of the surface to be sealed in the proximity of the sealing zone and will contact the latter, since as is known a lip is an element having a cross section which is reduced in the upward direction. Thus, ensurance is obtained that the arched-over supporting lip is constantly in engagement with the sliding layer which latter, in turn, is in constant engagement, in the friction zone, with the counter surface to be sealed, on account of the contact forces resulting from the effect of the backing lip.

The invention, under certain circumstances, advantageously provides that the support member and/or the backing lip are in constant contact with the layer, even if the sealing strip of this invention is not in engagement with a counter surface to be sealed. This is of advantage particularly if a single sealing strip is utilized to seal several, differently moved counter surfaces, since in such a case there could be the danger that, with surfaces to be sealed which have different directions of motion, the supporting lip, as seen along the sealing strip, would be bent once toward one side and then toward the other side, producing an intermediate zone of increased stress in the supporting lip.

According to a further embodiment of the invention, however, it is of special advantage to have the layer in contact with the support member and/or the backing lip only in case of a sealing engagement in the friction zone. If the sealing strip according to this embodiment is not in sealing engagement, the sliding layer curves away from the base member so that the support member and/or the backing lip are freed. Accordingly, the support member and/or the backing lip can be reoriented with each new sealing engagement with a respective counter surface in such a way that by the bending of the support member and/or the backing lip in the direction of movement of the counter surface to be sealed, the particular advantages provided by the sealing strip of this invention are in each case maintained. Moreover, the additional advantage is achieved that the sealing strip of this embodiment according to the invention provides a sealing effect even if the tolerance range in the spacing between the sealing strip and the counter surface to be sealed exceeds the possible spring deflection (stroke) of the support member, since due to the arching of the layer the latter still remains in engagement with the counter surface to be sealed.

This is of advantage particularly in case of shaft seals wherein, when passing through critical speed ranges, an especially high sealing clearance occurs for short periods of time.

To prop up the sliding layer, it is contemplated to employ a layer having a certain inherent resiliency characteristic. However, according to a further embodiment of the invention, it is especially advantageous to fill the space between the layer, on the one hand, and the base member, on the other hand, with a gas having a higher pressure than the pressure ambient outside of the sliding seal. In this embodiment, the spring effect of the support member is supported and/or the lifting off of the layer is ensured, by the compression of the occluded gas cushion. By the excess-pressure filling according to this invention, it is, however, also made possible to prevent any medium to be sealed off by way of the junction zones between the layer and the base member from leaking out by circumventing the sliding seal of this invention. Depending on the material employed for the support member, an inert gas particularly harmless to the support member can be utilized for the gas filling. This does not only prevent the oxidation of the support member, but rather this arrangement is also of special advantage in cases where a gas must be sealed off which is particularly aggressive to the support member.

Preferably, the sliding layer is chosen to be of such a length and is mounted outside of the friction zone to the base member in such a way that it projects therefrom except at the mounting points, and contacts the base member only under sealing engagement at least in the friction zone. Preferably, the sliding seal of this invention is attached by means of its base member; applications are definitely contemplated wherein this base member is not flexible, such as for example the support member, but rather is made preferably of an inelastic or even rigid material, e.g. a metal, a hard synthetic resin, or also of cardboard. It can, however, also be advantageous to make the base member elastic, for example to be able to press same especially conveniently into a preformed groove. In this connection, it is particularly advantageous according to other preferred embodiments to fashion the base and support members and/or the backing lip in one piece as an integral cord (spring, skein).

Due to the sliding seal according to this invention consisting of a base member, a covering sliding layer, and a support member, it is now no longer troublesome if the seal formed thereby is engaged, somewhat entrained, or bent over by the counter surfaces to be sealed which is moved relatively thereto. The invention ensures that in any event the sliding layer continues to remain in contact with the base member in the sliding zone. Even if foreign bodies are forced to move through the friction zone by the counter surface to be sealed, this does not prevent the reestablishment of a full seal by the sliding seal of this invention after the foreign body has passed through, as long as this seal has not been damaged mechanically. In particular, there is no danger that the sliding layer will perhaps be lifted off the support member, and the support member and the counter surface to be sealed come into undesired contact with each other.

According to preferred embodiments of the invention, the base member and the layer are in contact with each other, but this does not mean that the layer must be directly attached to the base member; rather, it is also contemplated for the layer to introduce its forces into the base member by way of connecting members. An important aspect of the invention is that the forces are not transmitted from the layer into the support member in the sliding zone, and thus damage the support member proper.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
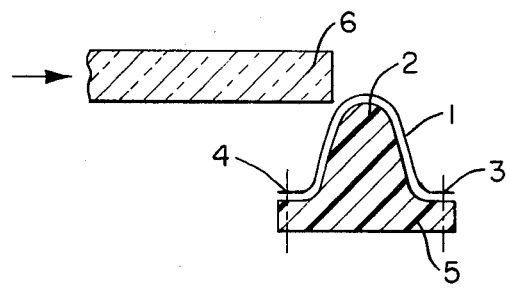
FIG. 1 is a side part-sectional view which schematically depicts a sliding seal constructed according to a first preferred embodiment of this invention.

In the following description, like reference numerals are used for similar structures in the various Figures.

FIG. 1 shows a sliding seal of this invention in a cross-sectional view; the base member 5 is fashioned to be suitable for mounting to a part to be sealed (not illustrated in the drawing), for example for insertion in a groove, and furthermore comprises a supporting lip. The sliding layer 1 is attached to this last-mentioned portion of the base member 5 on both sides of the support member 2, being of the sealing-lip type, pertaining to the base member 5, with the aid of a securing means 3, 4. The mounting can consist of a glued seam, a weld seam, or a textile seam and/or can be constituted by a suitably fashioned clamping seat and can be arranged either at the base member 5 or at a connecting member, e.g. the part to be sealed. The sliding seal of this invention, as illustrated in FIG. 1, is not in sealing engagement with the movable part 6 to be sealed, e.g. a window frame. In this arrangement, the sliding layer 1 is entirely extended away from the support members and/or the sealing lip 2, for example due to its inherent rigidity, and assumes an initial position, so that the position of the support member 2 and its otherwise possible permanent deformation is not, for example, forcibly imposed by a sliding layer which is in constant, firm contact therewith even if not in engagement. The base member 5 and the support member 2 are fashioned to be integral in this embodiment.

Figure 2:
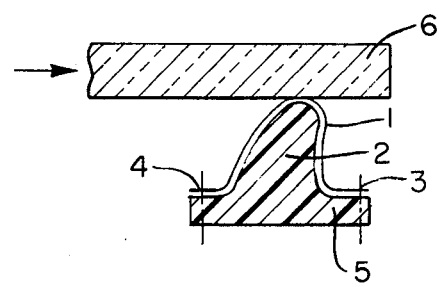
FIG. 2 depicts the seal of FIG. 1 with a friction engagement position.

In FIG. 2, the sliding seal shown already in FIG. 1 is once again illustrated, but this time in sealing engagement with the part 6 to be sealed and being moved relatively to the sliding seal (as depicted by the arrow in FIGS. 1 and 2). For the sake of simplicity, the following description will assume in all cases that the sliding seal is disposed on the stationary part of the parts moved relatively to each other and to be sealed; however, it is also contemplated to arrange the sliding seal of this invention on the moving part, unless inertial forces prevent this possibility.

Figure 3:
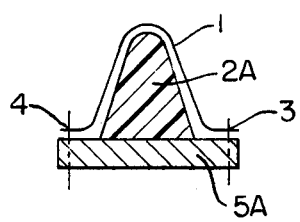
FIG. 3 is a sectional view of a second embodiment of a sliding seal according to this invention.

FIG. 3 shows a further embodiment of the sliding seal according to this invention wherein the support member 2A is arranged on a separate base member 5A on which is also arranged the sliding layer 1 by means of the securing features 3 and 4 on both sides of the support member 2A. The base member 5A is preferably fashioned so that it fits to the immobile part to be sealed, and it can be made of a material, independently of the requirements of the support member 2A, which can be selected with regard to strength and rigidity to satisfy the special requirements for mounting to the part to be sealed.

Figure 4:
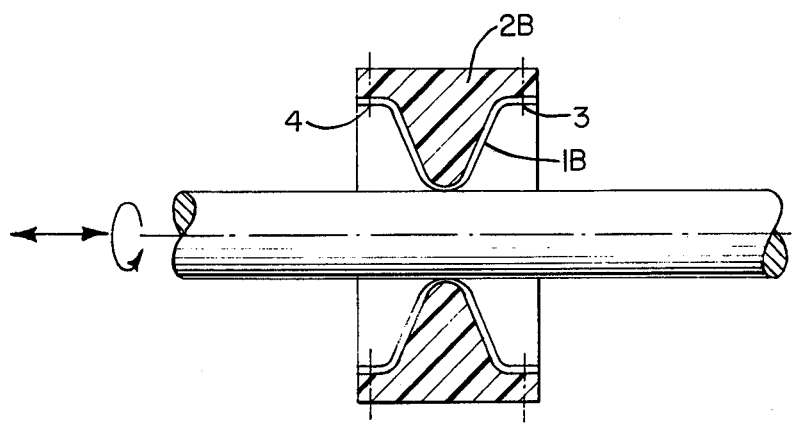
FIG. 4 is a part-sectional view of a sliding seal constructed according to a third embodiment of this invention being utilized as a shaft seal.

FIG. 4 shows a sliding seal of this invention in the form of a shaft seal arranged around a shaft which rotates and/or is moved in the axial direction, such as, for example, the propeller shaft of a ship. Such shafts execute appreciable axial movements during operation, especially due to the twisting of the ship's hull or due to axial vibrations dependent on the screw geometry and the rotary speed. The sliding seal of this invention, due to its aforedescribed properties, is especially suitable for maintaining its sealing effect constantly, independently of the axial motions and rotary motions. When using a separately bent-away sliding layer, the additional advantage is achieved that even if radial deflections of the shaft occur, the amplitude of which exceeds the deformation range of the support member 2B, there is still a certain sealing action even in this case, since, insofar as there is no pressure difference along the sealing zone, the sliding layer 1 still maintains its engagement with the shaft. Such case is present, for example, in a marine engine shaft if the propeller is damaged or deformed due to an accident.

Figure 5:
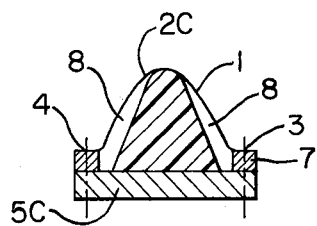
FIGS. 5, 6, and 8 are part-sectional schematic views further respective embodiments of sliding seals constructed according to this invention.

In FIG. 5, another embodiment of the invention is illustrated which differs from those discussed above in that respectively one seal 7 is arranged between the base member 5C and the sliding layer 1 in the region of the mounting zones 3 and 4; this seal closes off the inner space 8 formed by the support member 2C and the sliding layer 1. It is thus possible, when the arrangement is used in aggressive media which can damage the support member 2C but which are harmless to the sliding layer, to prevent the penetration of the aggressive medium into the inner space 8 at least on the side of the sliding seal of this invention where such aggressive medium is present. Accordingly, the material of the support member 2C can be selected completely independently of the location where the seal of this invention is utilized. However, it is also possible to fill the inner space 8 of the sliding seal, which is sealed off toward the outside, with air or an inert gas of a predetermined pressure, so that the sliding seal of this invention can be adapted with regard to its behavior to the ambient pressure of the subsequent operation site; for example, the sliding seal according to the invention can be used for the sealing of doors of airplanes having a high-pressure cell without having to provide special expansion chambers or openings for the gas occluded in the inner space 8 of the seal, in case of a pressure dop in the surroundings of the seal. Furthermore, the inherent rigidity of the sliding layer 1, which effects the spreading off of the sliding layer 1 from the support member 2C according to this invention, can be enhanced by an appropriate choice of the gas pressure within the interior of the sliding seal 8.

It is also contemplated to fill the inner space 8 at least in part with a maintenance agent or preservative for the material used for the support member 2C, thus providing a particularly long lifetime for the sliding seal of this invention. Finally, it is also contemplated to fill the inner space 8 entirely or partially with a lubricant, reducing the friction between the sliding layer 1 and the support member of supporting lip 2C in the region of the sliding zone. This measure contributes in particular toward still further preventing the friction-caused deformation of the support member which, in the final analysis, leads to a destruction thereof, to an even greater extent than the abovementioned features of the invention.

Figure 6:
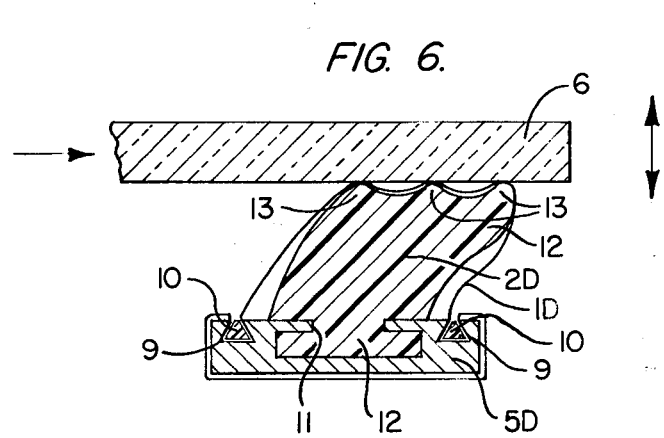

It is also contemplated to fashion the sliding zone to be of several parts to attain thereby an enhanced sealing effect. In FIG. 6, a support member 2D is illustrated which has several engagement lobes 13 in sealing engagement with the moving part 6 to be sealed, together with the sliding layer 1D which loosely extends around the engagement lobes 13. It is furthermore contemplated, as shown in FIG. 6, to fashion the sliding layer 1D as a closed tube surrounding the support member 2D and — even if not formed integrally with the latter — the base member 5D. This arrangement has the advantage that a seal according to FIG. 5 can be omitted. As shown in FIG. 6, the support member 2D is provided with a hammerhead-like extension 12 inserted in a correspondingly fashioned groove 11 of the base member 5D. On both sides of the support member 2, the base member 5D furthermore comprises an inwardly flaring groove 9 in which is inserted the sliding layer 1D; the sliding layer 1D is firmly clamped in the groove 9 by a subsequently impressed flexible element 10 and thus forms the mounting zones according to this invention.

Figure 8:
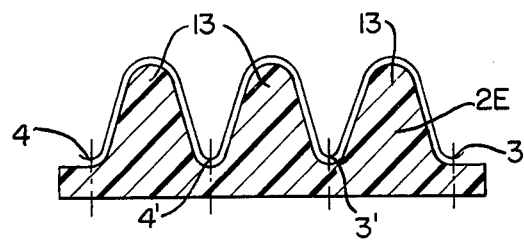

As illustrated in FIG. 8, it is also contemplated to provide additional mounting zones 3′, 4′ between the individual engagement lobes 13 of the support member 2E of this invention. This affords the advantage that the same sealing conditions prevail for each engagement lobe 13.

Figure 7:
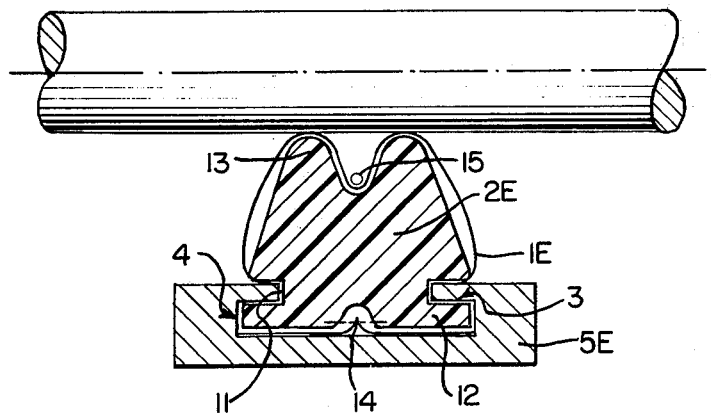
FIG. 7 is a part-sectional view of a still further embodiment of a sliding seal according to this invention being utilized as a shaft seal.

According to a further embodiment of the invention as illustrated in FIG. 7, it is particularly advantageous when using a single, continuous sliding layer 1E to provide respectively one spacer element 15 between several engagement lobes 13 of the support member 2E; such spacer element keeps the sliding layer 1E from engagement with the moving part to be sealed, but permits compensatory movements of the sliding layer 1E. In FIG. 7, a shaft seal is shown wherein the support member 2E comprises two engagement lobes 13, between which a relatively stiff ring 15, preferably of a metal, is inserted. The sliding layer 1E extends in this arrangement from the mounting zone 4 over the first of the two engagement lobes 13, is then extended over the periphery of the ring 15, then passes over the second engagement lobe 13 into the second portion of the friction zone, and then extends to the mounting zone 3.

FIG. 7 furthermore illustrates a support member 2E which, as already shown in FIG. 6, is inserted by means of a special configuration 12 in a groove 11 of the base member 5E. In the center of the profile 12, the support member 2E has a recess forming a hollow space toward the groove 11; this hollow space does not only serve for facilitating the pressing of the support member 2E into the groove 11 but also can optionally receive a seam 14, by means of which the two ends of the sliding layer 1E are connected. The sliding layer 1E is, in this embodiment, passed in the zone of the groove 11 over the surface of the support member 2E and is pressed by the latter to the wall of the groove 11 so that thereby the mounting zones 3 and 4 are being formed. However, it is also contemplated to permit a relative displacement of the sliding layer in the zone of the groove wall and to attach the seam 14 to the support member 2E. This type of mounting forms, so to speak, simultaneously the mounting zone 3 and 4 and constitutes, along the lines of this invention, actually two mounting zones, instead of a single mounting zone, arranged respectively on one side of the support member 2E and capable of absorbing tensile forces directed toward the support member. It is definitely within the scope of the present invention, as described above with reference to an example, to combine structurally both mounting zones 3 and 4, since this combined "mounting zone" must absorb tensile forces in two mutually opposed directions and thus clearly exhibits the function and features of two mounting zones.

Although as shown in the drawing, the support member can consist — especially suitably — of an elastic solid profile material, it is particularly advantageous in certain cases to make the support members of an elastic hollow profile or of wire material.

In case of sealing engagement, the form of the sliding seal illustrated in FIGS. 1–3 and 5, 6, as well as 8, the illustrations of which are referred to as being important in their specific configuration in this connection, especially has the result that the support member 2, 2A, 2C, 2D, 2E and also the sliding layer 1, 1B, 1D, 1E, covering the latter are inclined during the friction operation with regard to the friction-producing counter surface 6 (the part to be sealed). This can be seen from FIG. 2 as well as FIG. 6, wherein this inclination takes place preferably at an acute angle oriented in the direction of movement of the part 6 to be sealed. This effect can be furthermore enhanced by giving the support member a configuration already in the rest position, i.e. when it is not in sealing engagement, which imparts to the support member initially a certain inclination with respect to the surface to be sealed, particularly if the direction of motion of the counter surface 6 proceeds exclusively or preferably in one direction. Due to this inclination of the sealing lip and/or of the support member in the motion direction, it is readily possible to attain a compensation of, for example, dimensional inaccuracies during the installation of the seal, as well as an especially satisfactory equalization of any suddenly occurring changes in the friction characteristics of the frictionally engaging parts, as well as a good wear and tear behavior. In certain cases, an inclination of the lip in opposition to the direction of movement of part 6 can even be advantageous according to the invention.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A sliding seal comprising: base member means, a layer of material having a relatively low coefficient of friction, support member means carried by said base member means and disposed for supporting said layer at least within a sliding zone of the seal, said layer being fixedly adhered to said base member means in a shear resistant manner only at positions spaced from said sliding zone, whereby said support member means and said layer are movable with respect to one another in said sliding zone, and connection means for connecting said layer to said base member means in a shear resistant manner at respective opposite sides of said support member means at positions spaced from said sliding zone, said layer covering said support member means at least in the area of said sliding zone when connected by said connection means.

2. A sliding seal according to claim 1, wherein the support member means is constructed as a backing lip tapered from a thin extreme edge to a broader section at the base member means.

3. A sliding seal according to claim 1, wherein said layer is configured so as to be in contact with said support member means only in case of sealing engagement of said seal with a counter surface to be sealed pressed against said layer.

4. A sliding seal according to claim 1, wherein gas under a higher pressure than the ambient pressure outside the seal is provided intermediate the layer and the support member means.

5. A sliding seal according to claim 3, wherein gas under a higher pressure than the ambient pressure outside the seal is provided intermediate the layer and the support member means.

6. A sliding seal according to claim 1, wherein said support member means is completely covered by said layer when connected by said connection means.

7. A sliding seal according to claim 1, wherein said support member means exhibits a cross-section which, during sealing engagement with a member to be sealed, is inclined with respect to the direction of motion of a counter surface to be sealed.

8. A sliding seal according to claim 5, wherein said support member means exhibits a cross-section which, during sealing engagement with a member to be sealed, is inclined with respect to the direction of motion of a counter surface to be sealed.

9. A sliding seal according to claim 1, wherein said support member means consists of an essentially homogeneous material.

10. A sliding seal according to claim 3, wherein said support member means consists of an essentially homogeneous material.

11. A sliding seal according to claim 1, wherein said support member means and said base member means are integrally formed of an essentially homogeneous material.

12. A sliding seal according to claim 1, wherein said support member means and said base member means are formed of respective different materials and joined together by joining means other than said connection means.

13. A sliding seal according to claim 1, wherein said layer and said support member means are configured as a shaft seal for sealing the space between a surface of a rotating shaft and said layer.

14. A sliding seal according to claim 5, wherein said layer and said support member means are configured as a shaft seal for sealing the space between a surface of a rotating shaft and said layer.

15. A sliding seal according to claim 12, wherein said joining means includes a tongue and groove connection between said base member means and said support member means.

16. A sliding seal according to claim 15, wherein said connection means includes grooves formed in said base member means and flexible elements pressed in said grooves to clamp portions of said layer therein.

17. A sliding seal according to claim 16, wherein said layer completely encircles and encases said base member means and said support member means.

18. A sliding seal according to claim 17, wherein said support member means includes a plurality of spaced engagement lobes for engagement with said layer at a corresponding plurality of sliding zones.

19. A sliding seal according to claim 1, wherein said connection means includes grooves formed in said base member means and flexible elements pressed in said grooves to clamp portions of said layer therein.

20. A sliding seal according to claim 1, wherein said layer completely encircles and encases said base member means and said support member means.

21. A sliding seal according to claim 1, wherein said support member means includes a plurality of spaced engagement lobes for engagement with said layer at a corresponding plurality of sliding zones.

22. A sliding seal according to claim 21, wherein said layer is connected by connection means to said base member means at positions intermediate said engagement lobes as well as at opposite sides of the entire support member means.

23. A sliding seal according to claim 12, wherein said layer completely encircles and encloses said support member means.

24. A sliding seal according to claim 15, wherein said layer completely encircles and encloses said support member means, said connection means being formed by clamping action of the tongue and groove connection.

25. A sliding seal according to claim 24, wherein said layer and said support member means are configured as a shaft seal for sealing the space between a surface of a rotating shaft and said layer.

26. A sliding seal according to claim 4, wherein said gas is air.

27. A sliding seal according to claim 4, wherein said gas is an inert gas.

28. A sliding seal according to claim 1, wherein said connection means includes a glued seam.

29. A sliding seal according to claim 1, wherein said connection means includes a textile seam.

30. A sliding seal according to claim 12, wherein said support member means is formed of an elastic material and said base member means is formed of a relatively rigid material.

31. A sliding seal according to claim 1, wherein said support member means is formed of an elastomeric compressible material.

32. A sliding seal according to claim 1, wherein said support member means is formed of a foamed synthetic resin.

33. A sliding seal according to claim 1, wherein said support member means is formed by a tightly coiled spiral spring of a thin, resilient spring wire.

* * * * *